Figure 1:
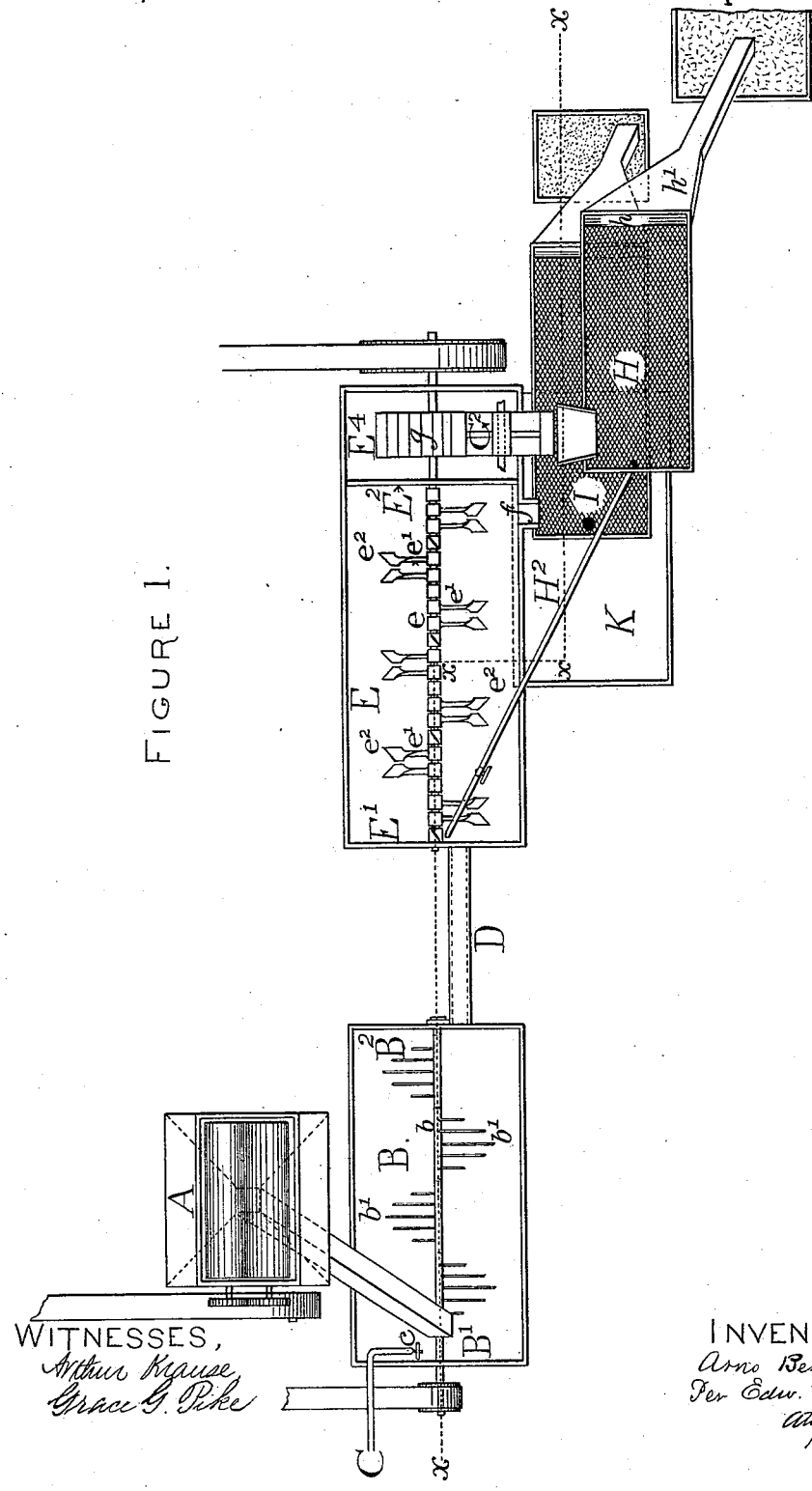

(No Model.) 3 Sheets—Sheet 1.

A. BEHR.
PROCESS OF TREATING CORN IN THE MANUFACTURE OF STARCH, GLUCOSE, AND OTHER PRODUCTS THEREFROM.

No. 247,152. Patented Sept. 20, 1881.

WITNESSES,
Arthur Krause
Grace G. Pike

INVENTOR,
Arno Behr
Per Edw. E. Quimby
Atty.

(No Model.) 3 Sheets—Sheet 2.

A. BEHR.
PROCESS OF TREATING CORN IN THE MANUFACTURE OF STARCH, GLUCOSE, AND OTHER PRODUCTS THEREFROM.

No. 247,152. Patented Sept. 20, 1881.

WITNESSES
Arthur Krause,
Grace G. Pike

INVENTOR
Arno Behr
Per Edw. E. Quimby
atty.

(No Model.) 3 Sheets—Sheet 3.

A. BEHR.

PROCESS OF TREATING CORN IN THE MANUFACTURE OF STARCH, GLUCOSE, AND OTHER PRODUCTS THEREFROM.

No. 247,152. Patented Sept. 20, 1881.

WITNESSES

INVENTOR

UNITED STATES PATENT OFFICE.

ARNO BEHR, OF JERSEY CITY, NEW JERSEY.

PROCESS OF TREATING CORN IN THE MANUFACTURE OF STARCH, GLUCOSE, AND OTHER PRODUCTS THEREFROM.

SPECIFICATION forming part of Letters Patent No. 247,152, dated September 20, 1881.

Application filed July 27, 1881. (No model.)

*To all whom it may concern:*

Be it known that I, ARNO BEHR, of Jersey City, New Jersey, have invented an Improved Process of Treating Corn in the Manufacture of Starch, Glucose, and other Products therefrom, of which the following is a specification.

My invention relates to a process of treatment which automatically effects the separation of crushed corn and water into three parts, the first consisting of the germs alone, the second consisting of the hulls and matter adherent thereto, and the third consisting of a mixture of the mealy parts of the corn and water, which, for convenience, I call "starch-milk," and which I maintain at a density of from 10° to 12° Baumé, in order that the hulls and other heavier portions of the corn shall sink to the bottom of the tank containing it and the germs rise to the surface and be floated off in a current of starch-milk overflowing from the tank upon an inclined vibrating sieve placed over a vessel in which the purified starch-milk is collected, the germs being discharged from the lower end of the sieve into or upon any suitable receptacle. The lower stratum of material in the tank is kept in a condition of agitation to facilitate the separation and rising of the germs, and the heavier matters which sink are by mechanical means carried to a prescribed part of the bottom of the tank, or to an adjacent tank, from which they are removed and deposited upon another inclined vibrating sieve, which collects and separately discharges the hulls and matter adherent thereto, and which is also placed over a vessel or trough for receiving the starch-milk which drains from the hulls and adherent matter. The continuity of these operations depends simply upon the continued introduction into the separating-tank of crushed corn and water in the proper relative proportions.

In another application which I am about to file I have described and claimed apparatus especially designed for my present purpose; but my process may be successfully performed in any system of apparatus embracing the following instrumentalities: first, a machine of ordinary construction for crushing corn which has been suitably softened by previous soaking or otherwise; secondly, a mixing-tank in which the crushed corn is agitated by stirrers and mixed with water; thirdly, a separating-tank for receiving the mixture of crushed corn and water, which is provided with means for stirring the lower stratum of the mixture and means for removing the heavier portions, which sink without imparting any lateral disturbance to the upper stratum of the mixture, and which is also provided with a chute of suitable width for conducting away the overflow which carries off the germs; fourthly, the usual sieves for screening the materials discharged from the separating-tank, and troughs or vessels to receive the purified starch-milk which drains through the sieves.

Apparatus of this general character is represented in the accompanying drawings, in which—

Figure 2:
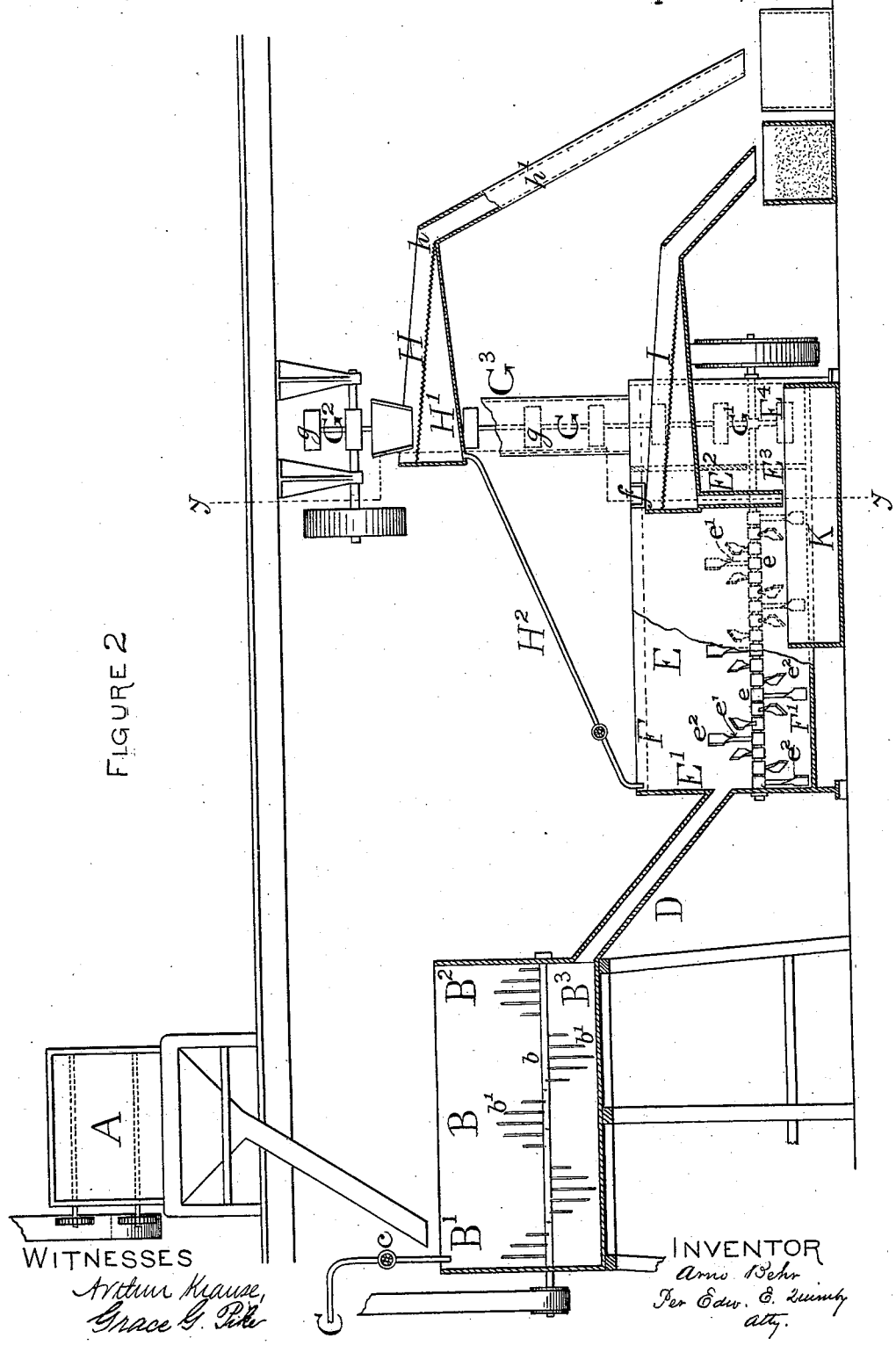
Figure 3:
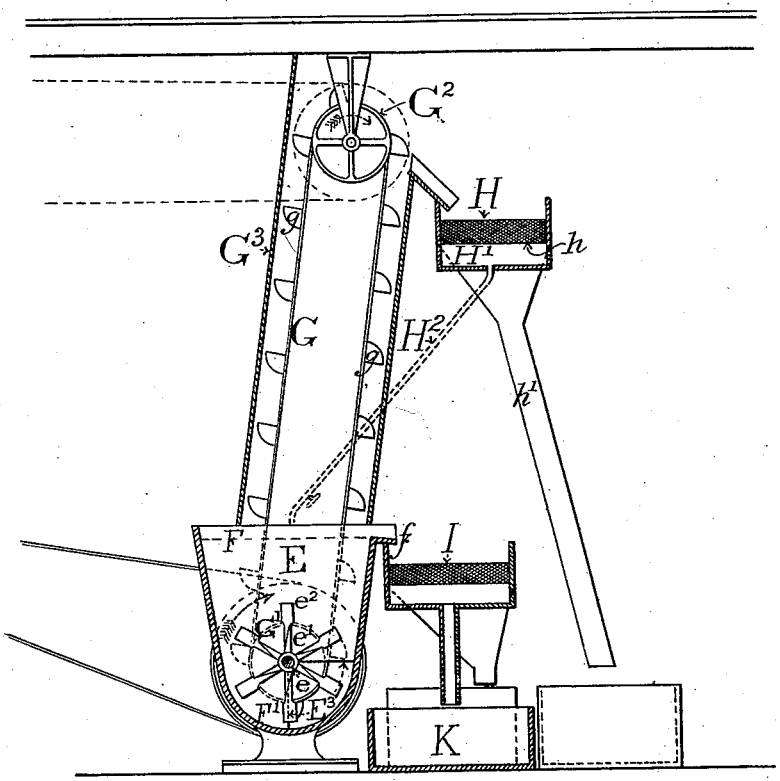

Figure 1 is a top view. Fig. 2 is a longitudinal vertical section through the line $x\,x$ on Fig. 1. Fig. 3 is a transverse vertical section through the line $y\,y$ on Fig. 2.

The apparatus consists of a crushing-machine, A, from which the corn, after being crushed, is discharged into the mixing-tank B. This tank has a round bottom, and is provided with a horizontal rotating shaft, $b$, having radially-projecting arms $b'$ arranged spirally around it. The direction of rotation of the shaft $b$ is such as to cause the spirally-arranged arms to drive the crushed corn from the end B', where it is fed into the mixing-tank, toward the end B², provided just above the bottom with the outlet B³. Water is supplied to the mixing-tank through the pipe C, provided with the valve $c$, by means of which the supply of water is regulated. In the mixing-tank the crushed corn is mixed with the water and beaten by the radial arms, and the germs are thereby detached from fragments of the hulls or of starchy matter to which they may adhere. From the mixing-tank the mixture of crushed corn and water is discharged through the outlet B³ into the inclined pipe D, which conducts it to the separating-tank E. The lower end of the pipe D is inserted into the end wall, E', of the separating-tank at some distance below the top, so that the upper stratum, F, of the mixture in the separating-tank will not be laterally agitated by the influx of crushed corn and water.

The separating-tank also has a round bottom, and is provided with the horizontal rotating shaft $e$, to which are attached the radially-projecting paddles $e'$, the blades $e^2$ of which are slightly inclined to their planes of rotation, in order that they may perform the double function of stirring the lower stratum, F', of the mixture in the separating-tank, and thereby promoting the rising of the germs to the surface, and also of pushing the hulls and other heavier matters which sink toward the transverse vertical partition $E^2$, and through the outlet $E^3$ into the settling-compartment $E^4$ of the separating-tank.

From the settling-compartment the hulls and other heavier portions of the corn may be removed by hand by the use of perforated scoops; or such removal may be effected by the means of the elevator-chain G, carrying the wire-cloth buckets $g$, which, by the movement of the belt around the lower pulley, G', are swept around the bottom of the settling-compartment and collect and carry up the solid matter therefrom, and as they pass over the upper pulley, $G^2$, discharge their contents upon the inclined vibrating sieve H, from the lower end, $h$, of which the hulls and heavier matter are discharged upon a chute, $h'$, by which they are conducted into any convenient receptacle for further disposal in the form of fodder, or for further treatment by grinding and screening in the ordinary manner to extract such portions of the starchy matter as have remained adherent to the hulls or undisintegrated in the preceding operations. The starch-milk which drains through the sieve H is caught in the trough H', from the lower end of the inclined bottom of which it is conducted by the pipe $H^2$ back to the separating-tank.

The upper part of the elevator-chain is surrounded by a box, $G^3$, which catches any drip from the buckets and conducts it back to the settling-compartment.

A chute, $f$, is inserted in the upper part of the wall of the separating-tank, for the purpose of conducting the overflow therefrom to the inclined vibrating sieve I, which screens the germs and pieces of germs carried off by the overflowing current of starch-milk and discharges them from its lower end upon or into any convenient receptacle, from which they are collected and dried preparatory to extracting the oil from them by the usual methods. The purified starch-milk which drains through the sieve I is caught in the starch-milk reservoir K, from which it is taken for manufacture into starch, glucose, and other products. The volume of the overflow of starch-milk is proportionate to the quantity of crushed corn and water introduced into the separating-tank.

The separating-tank must be made sufficiently long to afford time for the separation of the germs from the heavier material at the bottom of the tank before that material has reached the outlet which admits it to the settling-compartment, and the width of the chute $f$ must be proportioned with reference to establishing an overflow of just sufficient depth to float the germs, and consequently a system of surface-currents in the mixture contained in the separating-tank, all tending toward the chute, and thereby bringing with them the germs and pieces of germs which have risen to the surface of the mixture. Under these circumstances, so long as the supply of water to the separating-tank is so regulated as to keep the density of the mixture at from 10° to 12° Baumé, the separation of the crushed corn operated upon into three parts and the deposit of these parts respectively in separate receptacles is automatically carried on.

I do not herein claim the apparatus which I have described, because I am about to make a substantially similar apparatus the subject of another application for a patent.

I am aware that corn which has been subjected to wet crushing has been stirred in a tank preparatory to being sifted; but in such cases the mixture of corn and water has been separated into only two parts—to wit, the starch-milk and the refuse consisting of hulls and germs together. By my invention the hulls and germs are separated from each other and collected in different receptacles.

I claim as my invention—

The process of treating corn in the manufacture of starch, glucose, and other products therefrom herein described, which consists in mixing with corn which has been softened and crushed sufficient water to form a mixture of such density that the germs of the corn will tend to separate from the hulls and other heavier portions and rise to the surface of the mixture, and in mechanically stirring such mixture in a separating tank or compartment provided at the top with a suitable chute, and thereby causing the germs and pieces of germs to be carried off in a surface-current caused to overflow through the chute by the influx of crushed corn and water into the separating-tank, and in removing the hulls and adherent matter from the lower stratum of the mixture by mechanical means, the materials removed from the separating-tank being respectively screened in the usual manner, and the purified mixture of the mealy parts of the corn and water being collected in a suitable reservoir.

ARNO BEHR.

Witnesses:
GRACE G. PIKE,
WM. RUMBLE.